United States Patent [19]

Wilson

[11] 4,230,238

[45] Oct. 28, 1980

[54] FUNNEL PITCHER ENABLING BATTER TO BE PREPARED AND POURED INTO A COOKING UTENSIL

[76] Inventor: Warren Wilson, 644 Paramus Park Mall, Paramus, N.J. 07652

[21] Appl. No.: 960,461

[22] Filed: Nov. 13, 1978

[51] Int. Cl.³ ............................................... B67D 5/38
[52] U.S. Cl. ..................................... 222/158; 99/348; 141/98; 220/85 SP; 220/212; 222/570; 222/571
[58] Field of Search ............... 222/156, 158, 566, 567, 222/570, 571, 575; 73/426–428; 366/241; 99/348; 220/85 SP, 90.2, 90.4, 212; 141/98; D7/50; D9/290; 426/496, 588

[56] References Cited

U.S. PATENT DOCUMENTS

| | | | |
|---|---|---|---|
| 36,095 | 8/1862 | Keene . | |
| 272,924 | 2/1883 | Van Kersen . | |
| 584,275 | 6/1897 | Servier . | |
| 1,816,046 | 7/1931 | Johannes | 366/241 |
| 2,200,642 | 5/1940 | Shell . | |
| 2,550,568 | 4/1951 | Kersh | 220/90.2 X |
| 2,587,344 | 2/1952 | Livingstone | 222/571 X |
| 2,627,735 | 2/1953 | Dexter | 220/90.2 |
| 3,924,472 | 12/1975 | Harris | 73/426 |
| 3,987,943 | 10/1976 | Richmond, Jr. | 222/570 |

FOREIGN PATENT DOCUMENTS 1482192  8/1977  United Kingdom ...................... 73/426

Primary Examiner—Robert J. Spar
Assistant Examiner—Fred A. Silverberg
Attorney, Agent, or Firm—Lowe, King, Price & Becker

[57] ABSTRACT

Powdered mix, a liquid and binder are poured through an open top of a plastic vessel normally having a vertically disposed longitudinal axis. The ingredients are stirred with a utensil inserted through the open top. A pouring attachment, sealingly secured to the open top, includes a spout with a lower edge at a predetermined angle above the horizontal when the vessel axis is vertical. Residual ingredients in the vessel are stored by sealing the open top with a closed plastic cap. Indicia for quantities of the batter extend vertically along the vessel. The pouring attachment includes an apertured face inclined at approximately 45° above the horizontal to enable a user to see the contents as they are poured through the spout into the cooking utensil and to enable additional ingredients to be poured into the vessel. The pouring attachment and cap include a flanged sealing ring that snaps into a flange at the top of the vessel. To prevent dripping of batter from the spout when the vessel is vertically oriented, the spout angle is 23°.

5 Claims, 7 Drawing Figures

U.S. Patent   Oct. 28, 1980   Sheet 1 of 2   4,230,238
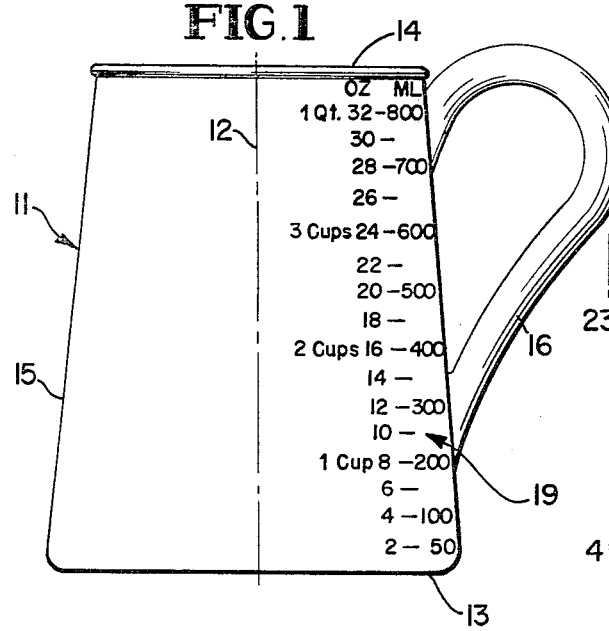
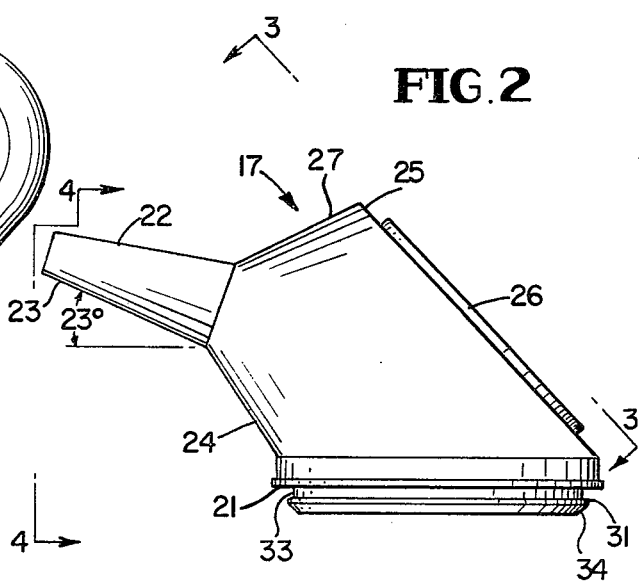
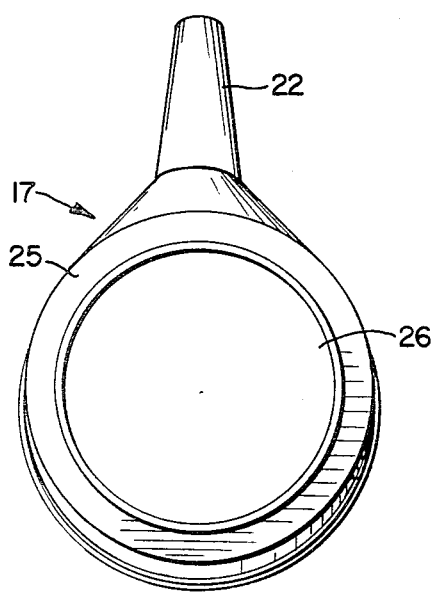
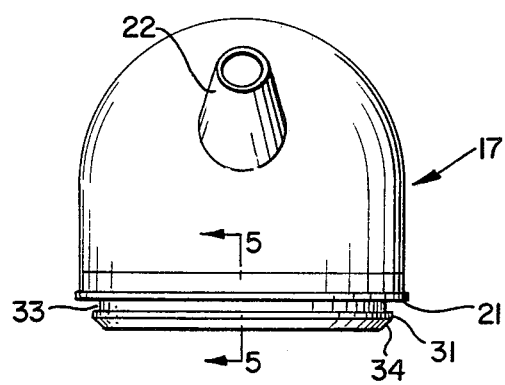
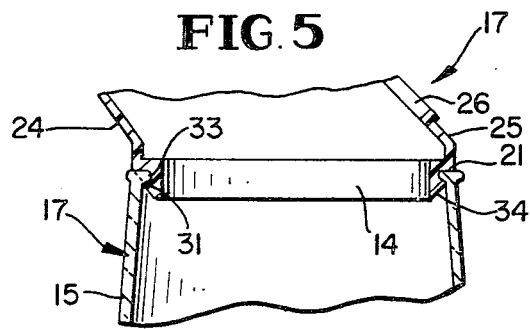

FUNNEL PITCHER ENABLING BATTER TO BE PREPARED AND POURED INTO A COOKING UTENSIL

TECHNICAL FIELD

The present invention relates generally to cooking utensils and methods of using same, and more particularly, to a cooking utensil wherein batter is poured into, prepared in, dispensed from, and stored in the utensil.

BACKGROUND ART

A funnel cake is formed from a mixture of powdered material including wheat flour, sugar, powdered eggs, powdered milk, leavening, salt and powdered artificial flavor that is combined with water and egg that functions as a binder. The mixture is poured from a funnel into a frying skillet filled with shortening or oil heated to a relatively high temperature, such as 375° F. The liquid batter is poured from the funnel in a web-like pattern into the skillet where it is cooked on each side for approximately 20–30 seconds and then removed and served with any one or several different toppings, such as confectioner's sugar, cinnamon sugar, molasses, ice cream or frozen yogurt.

In the past, funnel cake batter was prepared in a mixing bowl and thence poured into a wide mouthed funnel, i.e. cone shaped device having a downwardly extending spout. While the batter was poured from the mixing bowl into the funnel, a finger of one hand covered the funnel spout to prevent the flow of batter into the heated skillet. After the funnel was filled, the mixing bowl was laid on a counter with the other hand that also held the funnel. Then, the finger on the first hand was moved away from the spout so the mixture flowed by gravity into the skillet as the funnel was moved back and forth over the skillet to create the web-like pattern. To cut off the flow of mixture through the spout, after the pattern was formed, the finger of the first hand covered the bottom of the spout. Then, the spout was moved over the mixing bowl and excess mixture was poured into the mixing bowl, either through the spout or the open end of the funnel.

It is apparent that this prior art technique requires considerable manual dexterity on the part of the user. In addition, the constant use of a finger over the funnel spout is unsanitary, causing contamination of the product, which would be unacceptable for both commercial and household purposes. Further, there is considerable dripping of product from the spout of the funnel when it is laid down after the unused contents thereof have been returned to the mixing bowl. The dripping is messy and wasteful, and requires cleaning of the counter, to comply with commercially accepted sanitary standards.

The first attempt to obviate the use of separate mixing bowls and funnels involved a hand-held, sheet metal, galvanized oil can with a funnel spout and welded lead pieces. However, there were still problems of measuring the correct amount of batter, mixing, storing and using the finger to prevent batter from dripping from the spout. Various hand-held funnels operated with a controlled manual flow cutoff were also tried. While these manually controlled flow cutoff funnels resulted in slight improvement, they did not eliminate a problem of splattering hot oil, which may possibly burn a person pouring batter into the skillet. Further, it was still necessary to use a finger to prevent the flow of dripping batter.

In all of these prior art funnel devices, sheet metal has been found to be unacceptable material because it rusts, dents, bends, and riddles with sharp edges, so that handling food is hazardous. In addition, the welded lead pieces are hazardous to food handling, and the possibility of metal contamination occurs because the zinc, galvanized coating on the sheet metal eventually wears away with use and may become part of the batter.

A further difficulty with the prior art funnels is that they are difficult to clean because the batter clings and sticks to the inside spout of the metal surfaces. The spout is generally inaccessible to clean in the one-piece, oil can type units, as well as in the other manually controlled funnels. If the funnel is not adequately cleaned, the possibility of food contamination is extensive and unacceptable from both a commercial and household standpoint.

DISCLOSURE OF INVENTION

It is, accordingly, an object of the present invention to provide a new and improved utensil for enabling batter to be prepared, poured into a cooking utensil and stored, and to a method of utilizing such a utensil.

A further object of the invention is to provide a new and improved utensil for preparing, dispensing and storing batter such as utilized for making a funnel cake.

A further object of the invention is to provide a new and improved utensil for preparing, and storing batter, and for pouring the batter into a cooking utensil from a spout, wherein the need to utilize a finger as a plug for the spout is obviated.

A further object of the invention is to provide a new and improved, easily cleaned utensil for preparing, storing and dispensing batter.

A further object of the invention is to provide a single batter preparing, storing and dispensing utensil that enables waste and spillage of batter to be minimized and virtually eliminated.

Still another object of the invention is to provide a utensil for the preparation and dispensing of funnel cake batter wherein the necessity for a high level of manual dexterity is obviated.

In accordance with the present invention, a utensil for enabling batter to be prepared, poured into a cooking utensil, and stored comprises an upright vessel for ingredients of the batter. In normal position, the utensil has a flat bottom, a vertically extending longitudinal axis, and an open top at right angles to the axis. The top opening has an area sufficiently large to enable ingredients of the batter to be easily poured through it into the vessel and to enable a stirring implement for the batter ingredients to be inserted into the vessel. A pouring attachment is selectively connected in sealing arrangement with the open top. The pouring attachment includes a spout with a lower edge at a predetermined angle above the horizontal when the spout is connected to the vessel and the vessel axis is vertical. The attachment has a sloping side leading from the top and one side of the vessel to the lower edge to provide a guide for the batter from the vessel through the spout into the cooking utensil when the vessel axis is tilted approximately to the horizontal. The predetermined angle of the spout lower edge is such that dripping of the batter from the spout is prevented when the axis is vertical. For funnel cake and other similar batters, it has been found that a 23° angle above the horizontal prevents virtually all dripping. A closed cap is selectively connected in sealing arrangement with the open top when the pouring attachment is removed and when the ingredients are not being poured into the vessel. Thereby, the ingredients are maintained in a sealed condition to prevent spoilage from ambient materials entering the vessel and to maintain the residual batter in the vessel without spilling. Because of the sealed cap, considerable batter can be expeditiously made in advance and stored in a freezer for 6–9 months and/or stored in a refrigerator for several days.

To minimize the implements which must be necessary, all of the ingredients are poured into the vessel directly from containers therefore; it is presumed that all of the powdered materials have been premixed in a prepared mix, as can be obtained from Pennsylvania Dutch Treats, so that the only ingredients which must be separately poured into the vessel are water, eggs and the powdered mix. To obviate the need for any measuring tools, the vessel includes vertically extending indicia for quantities of the batter and is transparent in the region where the indicia are located. To enable a user of the utensil to see the mixed ingredients, as they are being poured through the spout into the cooking utensil so the amount of residual batter can be easily determined, the pouring attachment includes an opening in a face inclined at approximately 45° above the horizontal. Additional batter can be poured into the vessel through the open face when all of the batter has been exhausted. The face containing the opening extends from the top of the vessel and the side of the vessel opposite from the side of the vessel from which the spout extends, to a downwardly extending, retaining wall for the batter. The retaining wall extends to an upper side of the spout.

To assure that the spout extends in a radial direction opposite from a handle extending vertically along the vessel, the pouring attachment is snapped into the top of the vessel, rather than being secured to the vessel by other means, such as by screw threads.

Preferably, the vessel, pouring attachment and cap are fabricated of polypropylene plastic resin, to obviate the difficulties and food hazards associated with the use of sheet metal and welded lead devices.

Because the pouring attachment is removable from the remainder of the vessel, it is relatively easy to clean, in all of its nooks and crevices. This is in contrast to the prior art, oil can type of funnel devices wherein it was almost impossible to remove a considerable amount of the batter from the spout.

While the primary application of the invention is for the preparation, dispensing and storage of funnel cake batter, it is to be understood that the invention can be utilized in connection with the preparation, dispensing and storing of other types of batter which must be dispensed into a hot cooking utensil; exemplary of such batters are pancake batter, waffle batter, donut batter, cupcake batter and crepe batter.

In one embodiment, the vessel has a one quart capacity; however, it is to be understood that for institutional purposes, such as hospitals, colleges, hotels, restaurants, public schools, government facilities, etc., the vessel capacity could be increased to larger capacities, such as 2, 3 or 4 quarts. The institutional sized invention could hold enough pancake batter, for example, to pour 100 pancakes without refilling, in contrast to the 7 funnel cakes which can be made from the one quart vessel.

The above and still further objects, features and advantages of the present invention will become apparent upon consideration of the following detailed description of one specific embodiment thereof, especially when taken in conjunction with the accompanying drawing.

BRIEF DESCRIPTION OF THE DRAWING

FIG. 1 is a side view of a vessel that forms a part of the present invention;

FIG. 2 is a side view of a pouring attachment adapted to be utilized with the present invention;

FIG. 3 is a view taken along the lines 3—3 of FIG. 2;

FIG. 4 is a front view, taken along the lines 4—4 of FIG. 2;

FIG. 5 is a side sectional view showing the pouring attachment snapped into the vessel;

BEST MODE FOR CARRYING OUT THE INVENTION

Figure 6:
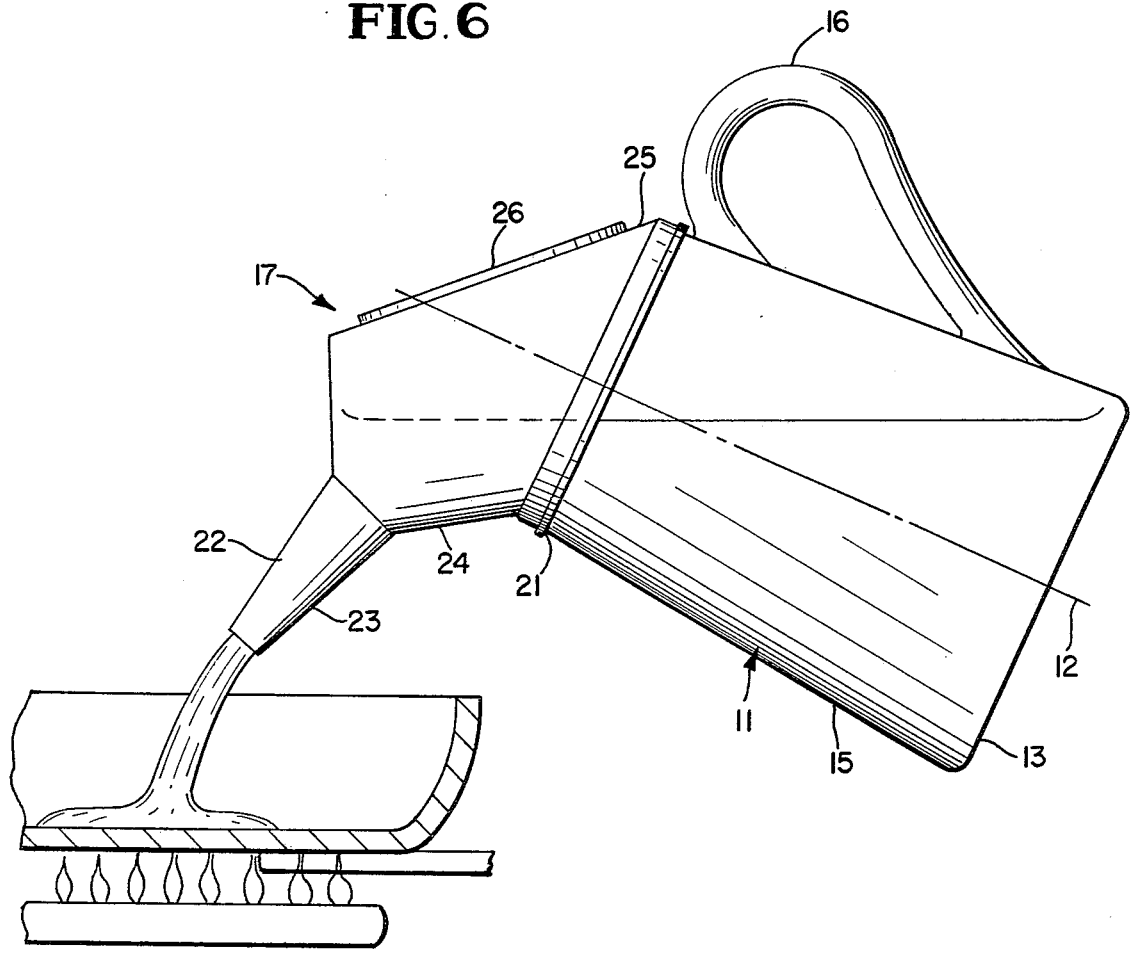
FIG. 6 is a view showing the manner in which the mixed ingredients are poured from the vessel and pouring attachment into a heated cooking vessel.
Figure 7:
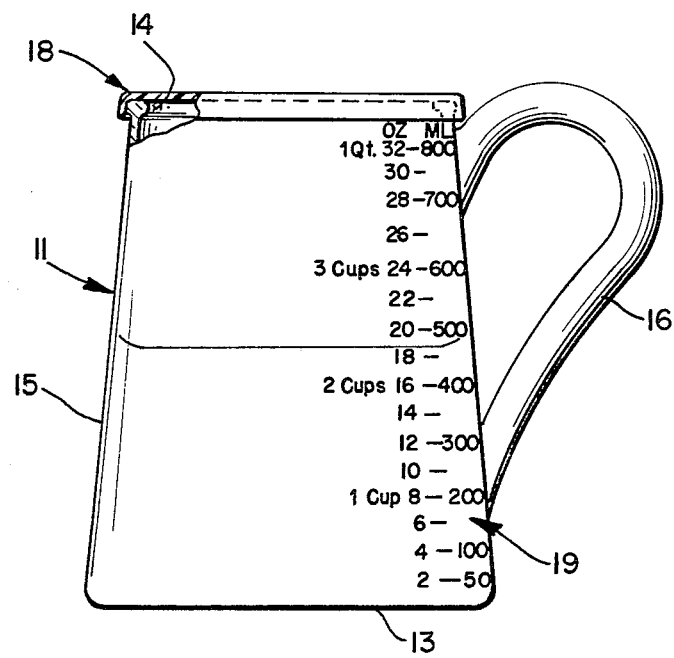
FIG. 7 is a view showing a cap in place on the vessel.

Reference is now made to the drawing wherein a transparent, frusto-conical vessel 11 having a vertically extending longitudinal axis 12 has a flat, closed bottom surface 13 and an open top 14 through which ingredients for forming the batter of various cooked mixtures, such as funnel cakes, pancakes, waffles, and crepes may be poured easily. Vessel 11 includes vertically extending, inwardly tapered cylindrical wall 15, on one side of which is secured vertically extending handle 16. Preferably, vessel 11 is made of relatively flexible, transparent material, such as polypropylene plastic resin so that pouring attachment 17 or cap 18 can be snapped into the open area of top 14; attachment 17 and cap 18 are also preferbly made of flexible polypropylene plastic resin. Vertically extending indicia 19 for quantities of the batter extend from, in proximity to the bottom face 13, to the top open face 14 of vessel 11 to enable a user of the vessel to determine how much of the batter material has been poured into the vessel. Thereby, it is not necessary to soil any other measuring utensils to prepare batter to be poured from vessel 11.

In a preferred, one quart embodiment, the open, circular cross-section top 14 has a diameter of approximately 3½ inches, while vessel 11 has a maximum diameter, near its bottom, of approximately 4½ inches. The vessel height is approximately 5 inches and handle 16 has a vertical extent, from approximately the top to close to the bottom of vessel 11, of approximately 4 inches.

Pouring attachment 17 includes a lower, open face 21, in the form of a ring that snaps into the top 14 of vessel 11, so that a seal is formed between the lower portion of the pouring attachment and the upper portion of the vessel. Pouring attachment 17 includes a spout 22 having a lower edge 23 that is inclined at an angle of 23° above the horizontal, when the pouring attachment is sealingly attached to vessel 11 and the vessel is oriented so that axis 12 is vertical. A guide for batter flowing from vessel 11 to spout 22 is provided along an upwardly sloping side 24 of the pouring attachment. Pouring attachment 17 includes a face 25 having a circular cross-section opposite from side 24. Side 25 is inclined at an angle of approximately 45° relative to the horizontal, an angle slightly less than the inclination angle of side 24. Side 25 includes a circular bore 26 through which the user of the utensil can look to determine how much batter is flowing from vessel 11 through the body of the pouring attachment and into spout 22. Bore 26 also enables additional batter to be poured into vessel 11 when all of the batter in the vessel has been spent. The body of the pouring attachment includes an arcuate upper retaining wall 27 that controls the flow of batter into the spout, and extends between face 25 and the upper side of circular cross section spout 22.

In the preferred, one quart embodiment, ring 21 of pouring attachment 17 had a diameter of approximately 3½ inches, so that it can fit into the top, open face 14 of vessel 11. Spout 22 has a minimum, outlet diameter of approximately 7/16 inch, an inlet diameter of approximately 1 inch, and a length of approximately 2 inches, while bore 26 has a diameter of approximately 3 inches.

Pouring attachment 17 includes a flanged sealing ring 31 that extends downwardly from face 21 and snaps into inwardly extending flange 32 at the top face 14 of vessel 11. Sealing ring 31 also extends radially outward from the below ring 33, that extends downwardly from face 21. To provide the required rigidity, ring 31 includes an inwardly flared, downwardly depending portion 34, which also assists in sealing the pouring attachment 17 to vessel 11.

In use, after the powdered, prepared mix, eggs and water have been poured into vessel 11, with pouring attachment 17 removed, a stirring attachment is inserted through opening 14 into the vessel and the ingredients are thoroughly mixed. Then, pouring attachment 17 is snapped into place, and vessel 11 is lifted with handle 16 so that the longitudinal axis 12 of vessel 11 is approximately horizontally oriented. The mixed batter then flows from vessel 11 through a pouring region in the vessel and through pouring attachment 17, along guide wall 24, and through spout 22 into a heated iron skillet containing oil or shortening heated to approximately 375° F. The batter is confined to the interior of pouring attachment 17, except for the batter that flows through spout 22. After the batter is poured into the heated skillet, vessel 11 is placed on a counter so that longitudinal axis 12 is vertically oriented. It has been found through experimentation that the 23° angle of side 23 above the horizontal when vessel 11 is resting on a counter, prevents dripping of the mixed ingredients from the open end of spout 22. The 23° angle causes the ingredients to flow back into vessel 11 along wall 23 and guide wall 24. Through experimentation it has also been found that if the inclination angle of side 23 is appreciably above 23°, excessive batter would flow into the body of pouring attachment 17, causing batter to flow out of bore 26. In addition, if the inclination angle of side 23 is considerably greater than 23° above the horizontal, excessive batter can flow into pouring attachment 17 and possibly cause the pouring attachment to be forced, by gravity, away from vessel 11.

While vessel 11 rests on the counter, the product is cooked in the skillet, and is then removed from the skillet. Then, batter is again poured from vessel 11 and pouring attachment 17 through spout 22 into the skillet and another funnel cake is made. The process is continued until the supply of batter in vessel 11 is exhausted, or until the desired number of funnel cakes has been made.

Then, pouring attachment 17 is removed from vessel 11 and is easily cleaned, despite the numerous corners and crevices therein. Cleaning is performed by putting the removed pouring attachment under a spigot so water from the spigot flows through opening 21, bore 26, and through spout 22.

Any residual amount of batter in vessel 11 can be stored for a few days in a refrigerator or for approximately 6-9 months in a freezer without spoiling due to air contact by sealing opening 14 with cap 18. During storage, closed cap 18, having the same sealing configuration as funnel attachment 17, is fitted into opening 14 to prevent the flow of a substantial amount of air and other ambient materials into the vessel, and maintain the residual batter in the vessel, without the possibility of the batter leaking out of the vessel.

While there has been described and illustrated one specific embodiment of the invention, it will be clear that variations in the details of the embodiments specifically illustrated and described may be made without departing from the true spirit and scope of the invention as defined in the appended claims.

I claim:

1. A utensil for enabling batter to be prepared and poured into a cooking utensil comprising an upstanding vessel portion for ingredients of the batter, said vessel portion having a flat bottom, a vertically extending longitudinal axis and a region through which batter flows at right angles to the axis, a pouring portion extending above the region so that batter flows through the region to the pouring portion when the axis is tilted approximately to the horizontal, said pouring portion having a spout with a lower straight edge at a predetermined angle above the horizontal when the vessel portion axis is vertical, said pouring portion having a straight sloping side leading from the region on one side of the vessel portion to the lower edge to provide a guide for the batter from the vessel portion through the spout into the cooking utensil when the vessel axis is tilted approximately to the horizontal, said straight edge extending from an intersection with the sloping side to the end of the spout, said straight side being at a greater angle to the horizontal than the lower straight edge when the axis is vertical, the pouring portion including a face inclined at approximately 45 degrees above the horizontal when the axis is vertical, the face extending from the region and the side opposite from the one side of the vessel portion to a downwardly extending retaining wall for the batter, the retaining wall extending to an upper side of the spout, said face having an opening positioned to enable the user of the utensil to see the contents as the contents are poured through the spout into the cooking utensil, said region and opening being positioned relative to each other and having an area sufficiently large to enable ingredients of the batter to be easily poured through them into the vessel portion said predetermined angle being approximately 23 degrees such that dripping of batter from the spout is prevented after pouring and when the axis is returned to the vertical and the batter is prevented from flowing through the opening during pouring of the batter through the spout.

2. The utensil of claim 1 wherein the vessel portion includes vertically extending indicia for quantities of the batter.

3. The utensil of claim 1 wherein the sloping side is inclined above the horizontal at an angle slightly greater than 45 degrees.

4. The utensil of claim 1 or 2 or 3 further including a handle extending vertically along a wall of the vessel portion opposite from the side from which the spout extends.

5. The utensil of claim 1 or 2 or 3 wherein said vessel includes a bottom portion and the pouring portion, said bottom portion having the flat bottom and an open top at right angles to the axis, the top having an opening in the vicinity of said region, said pouring portion being a pouring attachment selectively connected in sealing arrangement with the open top, and further including a closed cap having a flat top selectively connected in sealing arrangement with the open top when the pouring attachment is removed and when the ingredients are not being poured into the vessel.

* * * * *